No. 626,775. Patented June 13, 1899.
C. H. SHEPARD.
TYPE WRITING MACHINE.
(Application filed June 25, 1897.)
(No Model.)

WITNESSES:
mwPool
K. V. Donovan

INVENTOR
Chas. H. Shepard
BY
Jacob Felbel.
ATTORNEY.

UNITED STATES PATENT OFFICE.

CHARLES H. SHEPARD, OF NEW YORK, N. Y., ASSIGNOR TO THE WYCKOFF, SEAMANS & BENEDICT, OF ILION, NEW YORK.

TYPE-WRITING MACHINE.

SPECIFICATION forming part of Letters Patent No. 626,775, dated June 13, 1899.

Application filed June 25, 1897. Serial No. 642,244. (No model.)

*To all whom it may concern:*

Be it known that I, CHARLES H. SHEPARD, a citizen of the United States, and a resident of New York, (Brooklyn,) in the county of Kings and State of New York, have invented certain new and useful Improvements in Type-Writing Machines, of which the following is a specification.

My invention has for its main object to produce a simple, cheap, and effective ball-bearing type-bar; and it consists in certain features of construction and combinations of devices hereinafter more fully described, and particularly pointed out in the appended claims.

Figure 1:
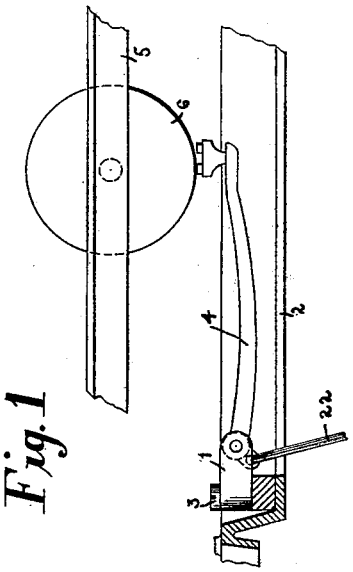
Figure 4:
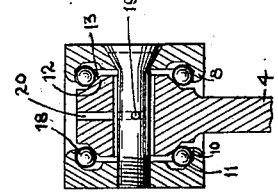
Figure 5:
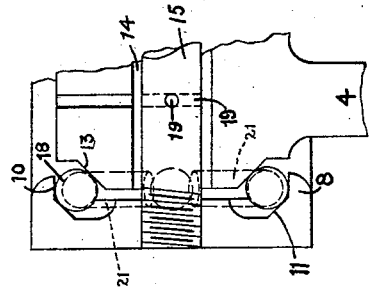
Figure 2:
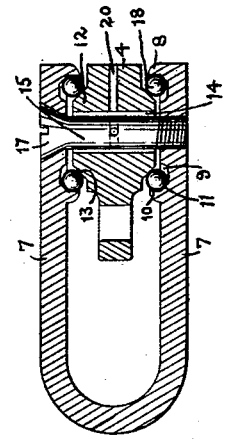
Figure 6:
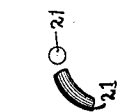
Figure 3:
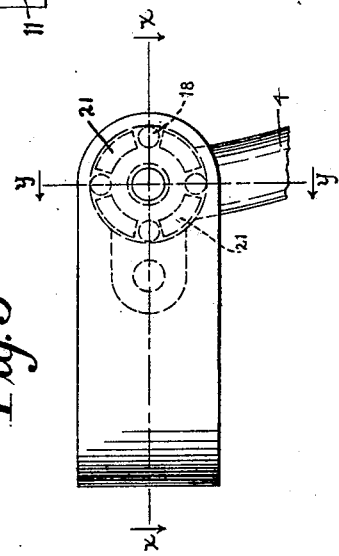

In the accompanying drawings, Figure 1 is a side elevation of a portion of a type-writing machine containing a type-bar ball-bearing embodying my improvement. Fig. 2 is an enlarged horizontal section taken at the line $xx$ of Fig. 3. Fig. 3 is a side elevation. Fig. 4 is a vertical section taken at the line $yy$ of Fig. 3. Fig. 5 is an enlarged section similar to Fig. 4. Fig. 6 is a detail view of one of the ball separators or segments.

In the several views the same part will be found designated by the same numeral of reference.

1 designates a hanger or bracket which is U-shaped in plan view and which may be secured to the type-ring 2 of the machine by a screw 3. At the forward end of the bracket is pivotally mounted the type-bar 4 by means of the construction to be presently described. 5 designates a portion of the carriage of the machine, and 6 its platen.

The hanger or bracket 1, near the forward free ends of its side arms 7, is formed or provided on the inner side of each side arm with a circular ring or boss 8 and with a circular depression 9, the inner surface 10 of the boss or ring forming a bearing-surface, and the inclined surface 11 of the depression likewise forming a bearing-surface.

The type-bar 4 is provided on each side with a circular projection or boss 12, which is tapered, as at 13, to form a bearing-surface, and the said type-bar is provided with a transverse perforation 14 axially of the bosses and the bearings 12 for the passage therethrough of a screw 15, the threaded end of which takes into a tapped hole in one of the side arms of the hanger, and the nicked conical head 17 seats in a conical depression in the other arm of said hanger. By turning this screw in the proper direction the bearings may be properly adjusted with reference to each other and to the two sets of interposed antifriction-balls 18 employed. The screw may be turned by the application of a screw-driver to the nick or slot thereof, or said screw may be provided with a transverse perforation 19 for the insertion of a turning pin or wire, in which event the hub of the type-bar should be provided with a radial perforation 20, through which the pin or wire first passes before entering the hole in the screw, which, preferably, has two perforations 19 extending clear through the body of the screw, one at right angles to the other.

Each set of antifriction-balls may comprise any desired number of balls. In the example shown I have illustrated four balls to each set; but three balls may be used or more than four, if desired. One of the objects of my invention is to reduce the number of balls in order to cheapen the construction and reduce the friction of the ball-bearing as much as possible. To this end where a less number of balls are used than would fill the circular trackway formed by the opposing bearing-surfaces I interpose between succeeding balls an arc-shaped or segmental filler or strip 21, made, preferably, of round wire and which, as shown at Figs. 3 and 5, substantially fills the spaces between successive balls. These independent curved or segmental pieces 21, of which four are shown in the said views, are loosely inserted in the trackway and operate to always maintain the balls separated and in their proper working condition relatively to one another and to the bearings. Being loose, said segmental separating devices move with the balls during the vibrations of the type-bar, but without adding appreciably to the resistance.

The separators 21 have their longitudinal axes substantially in the arc of a circle through the centers of the balls 18, such circle having its center substantially at the center of motion of the type-bar. Preferably the ends of the separators are planes at right angles to the arc-shaped rods or bars that form the fillers or separators 21, such planes (extended) converging toward the center of motion of the type-bar. The described relations of the fillers secure that the balls are held without any tendency to jam in the trackway, in which the separators slide loosely.

As far as one part of my invention is concerned, the separating devices may be omitted and the trackway on each side entirely filled with balls, and as far as the shape of the bearings is concerned they may be curved instead of plane, so long as they are tapering, conical, or inclined and capable of being adjusted to compensate for their wear as well as for that of the balls.

It will be understood that the separating device 21 is of such diameter relatively to the trackway as not to interfere with the taking up of wear in the balls and the bearings. As far as the feature of my invention relating to the separating devices is concerned, the construction of hanger and type-bar may be considerably varied from that herein shown.

The usual connecting-rod 22 is shown at Fig. 1 for actuating the type-bar and is attached to the rear shorter arm of said bar.

What I claim as new, and desire to secure by Letters Patent, is—

1. In a type-writing machine, the combination of a hanger comprising two side arms or members each having a circular bearing-surface on its inner side, a type-bar having on each side a bearing-surface and a central transverse perforation, two sets of antifriction-balls, and a transverse adjusting device engaging with said hanger arms or members and passing through the said transverse perforation in the type-bar.

2. In a type-writing machine, the combination of a hanger having two side arms or members each provided on its inner side with a circular bearing-surface, a type-bar having a bearing-surface on each side and a central transverse perforation, two sets of antifriction-balls, and a screw passing through said transverse perforation and having its threaded end engaging a threaded perforation in one of the hanger-arms and its head seated in the other of said arms.

3. In a type-writing machine, the combination of a hanger comprising two side arms or members having each a circular bearing-surface on its inner side, a type-bar having on each side a bearing-surface and a radial pin-hole, two sets of antifriction-balls, and an adjusting device passing through said transverse perforation and connecting together the said arms or members and provided with a pin-hole.

4. In a type-writing machine, the combination of a hanger comprising two side arms or members having each a bearing-surface on its inner side, a type-bar having a bearing-surface on each side, a transverse perforation, an adjusting-screw, two sets of antifriction-balls, and two sets of interposed loose segmental separating devices between said balls and surfaces, and sliding in the trackway formed by said surfaces and being adapted to contact with the balls at points substantially in the circle passing through the centers of the balls.

Signed at Ilion, in the county of Herkimer and State of New York, this 21st day of June, A. D. 1897.

CHARLES H. SHEPARD.

Witnesses:
CHARLES E. MAURICE,
RALPH W. GOUGH.